US007126708B1

(12) United States Patent
McConn et al.

(10) Patent No.: US 7,126,708 B1
(45) Date of Patent: Oct. 24, 2006

(54) METHOD FOR ENABLING A PHOTOLAB TO PROCESS DIGITAL IMAGES AND RELATED DATA

(75) Inventors: Christopher E. McConn, Santa Cruz, CA (US); Ronald Wong, Campbell, CA (US); John C. Marshall, Los Gatos, CA (US); Alvin Wang, Palo Alto, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 852 days.

(21) Appl. No.: 09/945,100

(22) Filed: Aug. 31, 2001

(51) Int. Cl.
*G06F 15/00* (2006.01)

(52) U.S. Cl. ...................................... 358/1.15; 358/402

(58) Field of Classification Search ................. 358/1.1, 358/1.9, 1.15, 402; 355/40; 396/639; 705/26, 705/33, 80; 709/201, 205, 248
See application file for complete search history.

(56) References Cited

U.S. PATENT DOCUMENTS

| | | | | |
|---|---|---|---|---|
| 6,017,157 | A | 1/2000 | Garfinkle et al. | 355/40 |
| 6,133,985 | A | 10/2000 | Garfinkle et al. | 395/639 |
| 6,324,521 | B1 * | 11/2001 | Shiota et al. | 705/27 |
| 6,657,702 | B1 * | 12/2003 | Chui et al. | 355/40 |
| 6,701,343 | B1 * | 3/2004 | Kenyon | 709/204 |

* cited by examiner

*Primary Examiner*—Gabriel Garcia
(74) *Attorney, Agent, or Firm*—Canon USA IP Division

(57) ABSTRACT

A system and business method for enabling photolabs to provide digital image processing services, and at the same time, to provide the photolabs with the ability to use their own branding in connection with their services and to the control of all business aspects of the service, including the creation of a customized website, digital image product offerings, branding, pricing, promotions, advertisements, and film prints and related image imprinted product fulfillment.

10 Claims, 3 Drawing Sheets

METHOD FOR ENABLING A PHOTOLAB TO PROCESS DIGITAL IMAGES AND RELATED DATA

BACKGROUND OF THE INVENTION

Traditionally, a customer desiring to obtain film prints for pictures taken with a non-digital camera takes the film roll to a "photolab" which develops the film into film prints using a chemical process. The photolab may either develop the film on site, or send the film roll to an off-site film developer who returns the prints to the photolab for pick-up by the customer.

Recently, with the introduction of the digital image processing technology, new business methods have arisen for producing film prints from digital images. Several well known film processing companies have developed proprietary scanning technology which enables photolabs to scan film negatives in order to produce digital images, which can then be used to fulfill film print orders. Many of these film processing companies also provide the photolabs with the ability to send or upload the images over the Internet to the company by logging onto the company's proprietary website. The images are then stored in a database or archived so that the images can be viewed online. In order to view the images, the photolab provides the film customer with an identification number which the customer uses to obtain access to the images after logging on the company's proprietary website. In this manner the customer can preview the images to be printed and/or to be sent digitally via email to someone else. Since the images are also stored in the company's database, the customer is also given the opportunity to organize the images by creating photo albums, which also can be shared electronically with others.

Similarly, several other "photo-sharing sites" have entered the market. Essentially, the photo-sharing sites offer the same services as the film processing companies, but in some instances on a smaller scale. However, the photo-sharing sites do not offer customers the ability to produce traditional film prints using a non-digital, chemical process.

A further important development is that photolabs are now attempting to continue to offer traditional, non-digital film processing and to simultaneously compete with the large film processing companies and photo-sharing sites by offering the photolab's customers, who may have purchased digital cameras, the ability to process digital images. Unfortunately, since the photolabs do not have the expensive technological infrastructure to process, store, and retrieve digital images, the labs have been forced to form alliances with, rather than compete with, the film companies and the photo-sharing sites. Naturally, these alliances fail to provide the photolabs with the ability to offer competitive pricing for digital film processing since the pricing is established, for instance, by the film company. Equally significant, if not more important, is the fact that the photolab is not able to control the branding and marketing of its digital film service. Although the photolab can develop its own website for its print film service, the digital film processing aspect of its business is controlled by the website of the film company, which advertises the products and services of the film company. Another limitation is that the film company controls the photolab's ability to satisfy its customer's print fulfillment needs because the company limits the choice of print fulfillers to those provided on the film company's website.

As a result, the photolabs cannot compete successfully with the film companies and the photo-sharing sites, who are able to capture photolab customers seeking digital image processing and film fulfillment. As customers continue to shift from buying traditional film cameras to digital cameras, the photolabs will continue to lose those customers unless the labs can establish their own identity in the digital image processing industry and can offer a competitively priced service. The present invention discloses a system and business model which enables each photolab to offer all aspects of digital film processing and print fulfillment at competitive prices and with the ability to promote and establish the labs' own identity as a film processing company. The invention accomplishes this objective without requiring the lab to purchase any expensive and complex computer equipment and, at the same time, allows the photolab to continue to provide personal service to its existing customers who do not have digital image processing needs.

SUMMARY OF THE INVENTION

The present invention comprises a system and business method for enabling photolabs to provide a digital image processing service, and at the same time, to provide the photolabs with the ability to use their own branding in connection with their services and to control all business aspects of their services, including the development of a customized website, product offerings, pricing, promotions, advertisements, and film and product fulfillment. The photolab is able to provide these digital image processing services without incurring the substantial capital expenditure of acquiring expensive computer equipment and related electronic infrastructure.

DETAILED DESCRIPTION OF THE INVENTION

The present invention comprises a system and business method for enabling photolabs to provide a website based digital image service to their customers, and at the same time, to provide the photolabs with the ability to use their own branding in connection with their services and to control all business aspects of their services, including the ability to control pricing, advertisements, promotions, product offerings, and film prints and image imprinted product fulfillment. For the purpose of the present invention, the term "photolab" is used to refer to any company that traditionally develops film received from a customer by using a chemical process in order to develop film prints. The term also refers to any company that offers digital film processing, including the production of prints from digital images, and services and products related to those activities. For example, such companies include auction and community websites, imaging application software vendors, digital camera and scanner vendors, and event and amusement park vendors. In addition, the term "digital image products" generally refers to film prints and to image imprinted products (e.g., coffee cups, tee-shirts and other personalized products).

Figure 1:
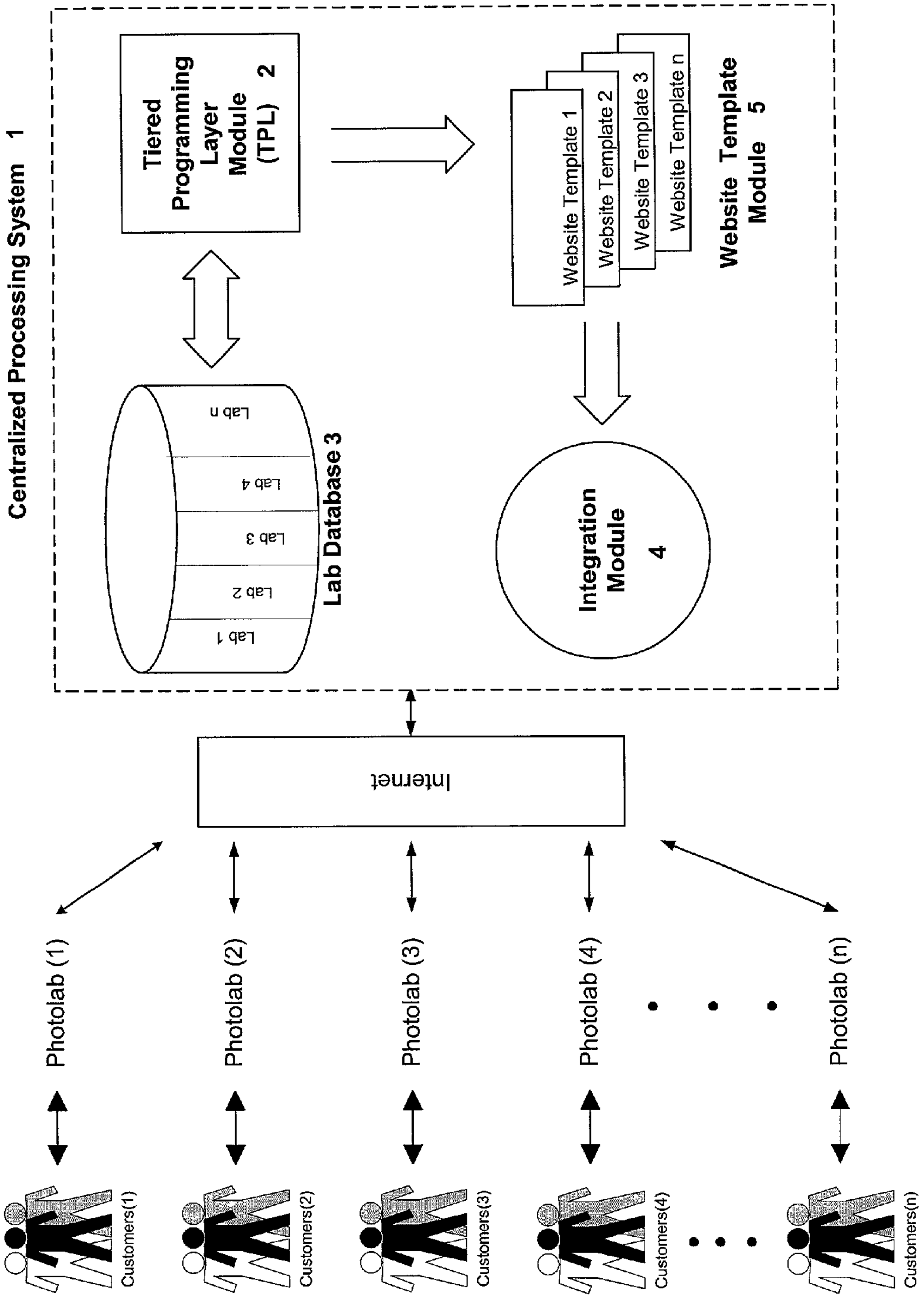
FIG. 1 is an illustration of the present invention's creation of a customized website for a photolab.

As illustrated in FIG. 1, the present invention includes a centralized processing system 1, which is in electronic communication over the Internet or World Wide Web, or some other network, with photolab computers located at a plurality of photolabs (photolab$_1$, photolab$_2$, photolab$_3$, photolab$_4$ . . . photolab$_n$). The centralized processing system 1 is used to customize a website for each photolab. Initially, each photolab sends website feature-set data to the central processing system 1 which uses a tiered programming layer module 2 to process the data and store it in a lab database 3. The website feature-set data, which is used to create the website, includes: the photolab company's identity and contact information; website template selection which includes style schemes (e.g., color and font); branding which may include trademarks, service marks, logos, artwork, taglines messages and other copyrighted materials; terms and conditions and privacy policies applicable to customers using the company's website; a Uniform Resource Locator (URL) to other related websites pertaining to the company; digital image products, including the pricing of those products; shipping options; fulfillment options; promotions (e.g., discount coupons, one-time user coupons and product specific coupons) tax rules, payment options; and the identity of a merchant department account.

Once the website feature-set data is received from each photoshop by the centralized processing system 1, the data is processed by the tiered programming layer 2 which stores the data in a lab database 3. The lab database 3 is a partitioned database in that each website feature-set data which relates to a specific photoshop is indexed and associated with the photoshop that generated the data. This feature is illustrated in FIG. 1 by showing that lab database 3 is partitioned into separate locations: Lab$_1$, Lab$_2$, Lab$_3$, Lab$_4$ . . . Lab$_n$. In this manner, the feature-set data applicable to each photoshop is also readily retrieved by the tiered programming layer 2 to be used to either create the photoshop's website or to update the site. The present invention creates a customized website for each photoshop by using the website template identified by the photoshop, and the template is retrieved by the tiered programming layer 2 from a set of website templates 5. The template and all other web feature-set data is then sent to an integration module 4. The integration module 4 then uses the feature-set data to complete the template, and thus, create a customized website, including a display on the website of the photolab's branding which may include trademark, service marks, logos, artwork, taglines, messages and other copyrighted materials. Once the website is created, the centralized processing system 1 provides each photolab with its own URL address, and each photolab is now able to similarly inform its customers (customer$_1$, customer$_2$, customer$_3$, customer$_4$ . . . customer$_n$), of the new site and the ability that its customer have to store digital images, create photo albums, and order film prints and other imaged imprinted products.

The centralized processing system 1 and tiered programming layer 2 also provides each photolab with the ability to create customer accounts. This feature of the invention is provided to the photolab as a part of the photolab's website. By using this aspect of the invention, customers using the photolab's website are able to provide personal information (e.g., name, address, email and credit/debit card numbers) to the photolab to be used to view digital images and buy products. Each customer is given a unique identification number, and the customer's account and image information is stored by the tiered programming layer 2 in the partitioned or indexed portion of the lab database 3, which is assigned or allocated to the customer's photolab.

Figure 2:
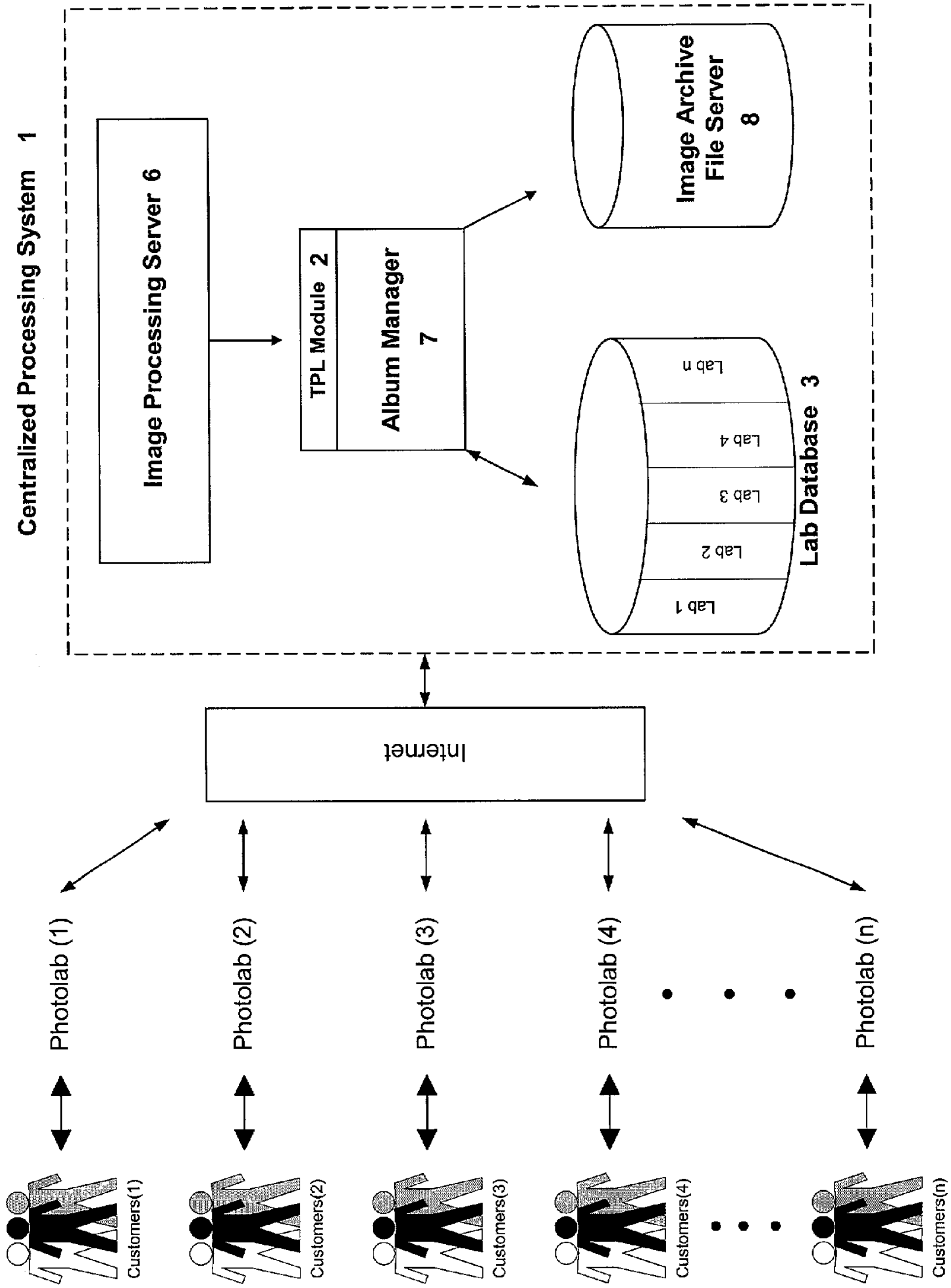
FIG. 2 is an illustration of the manner in which a customer uses a photolab's customized website to process and archive digital images.

FIG. 2 illustrates the manner in which customers (customer$_1$, customer$_2$, customer$_3$, customer$_4$ . . . customer$_n$) use the present invention to store digital images in a database for subsequent viewing by the customer or others with a right of access, and for ordering film prints and image imprinted products. For example, customers may either store their digital images directly by using their photolab website, or request that the photoshop store the images for them. Either way, when the digital images are sent, the image processing server 6, within the centralized processing system 1, examines the images for image format integrity and performs any necessary image reformatting functions. The image processing server 6 then passes the digital images, along with the identity of the photolab that sent the images, the customer's identity, and other image data, to the tiered programming layer module 2. The tiered programming layer 2 validates the data by confirming that the customer is a member of the photolab website, and then sends the validated data to an album manager 7 which stores the image data in the image archive file server 8 and associates the images to the customer. The album manager 7 also stores the address of the customer's image data in the portion of the partitioned or indexed lab database 3 associated with the customer's photolab.

Once the customer's images are stored and the address of the images are stored in the lab database 3, the digital images may be readily accessed and viewed by the customer by using the photoshop website that was used to store the images.

Figure 3:
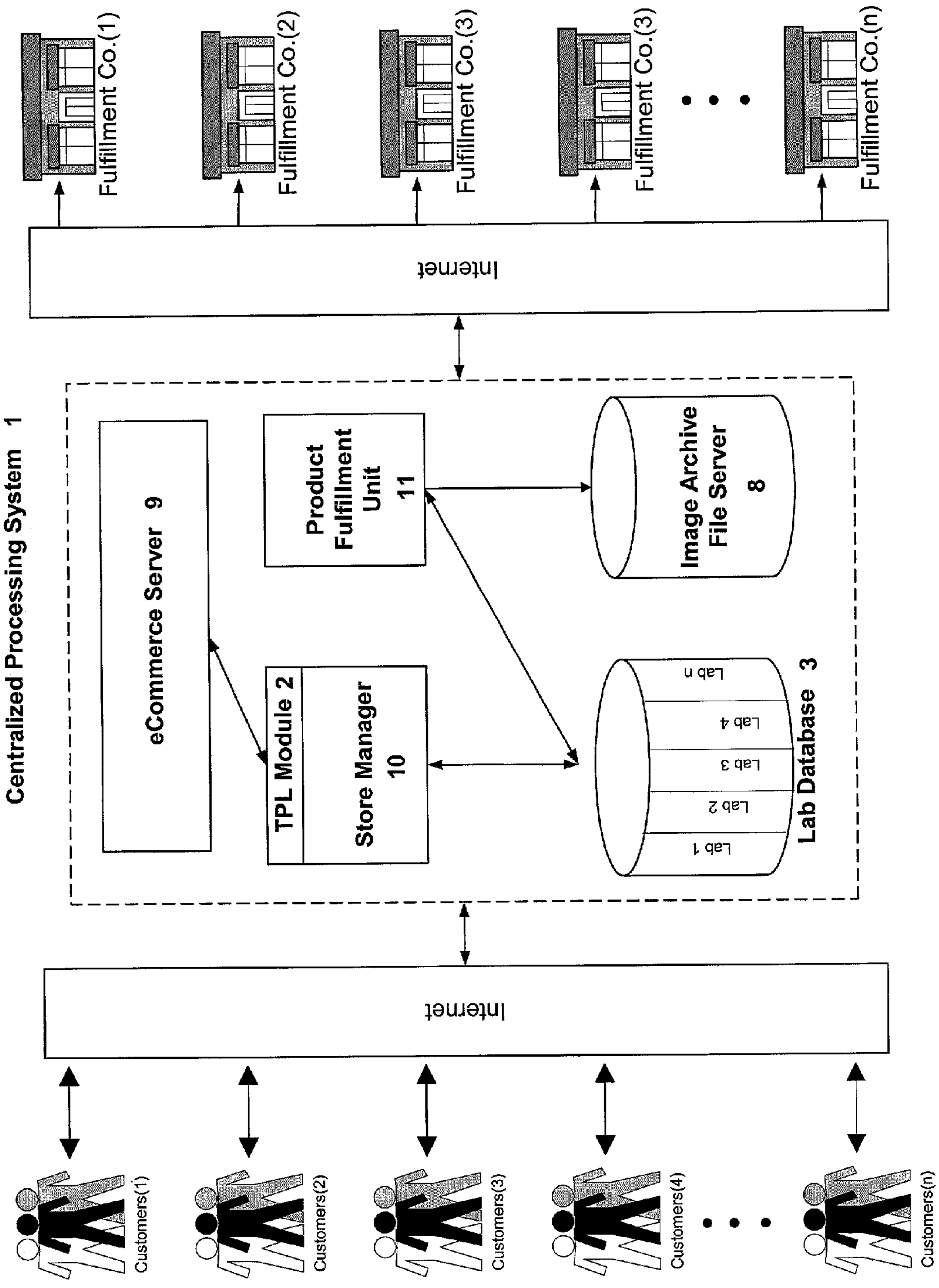
FIG. 3 is an illustration of the manner in which a customer uses a photolab's customized website to purchase film prints and image imprinted products.

FIG. 3 illustrates the manner in which the present invention allows photolabs to utilize their customized website to exercise complete control over the eCommerce aspect of their business. For example, when one of a photoshop's customers accesses the photoshop's website in order to purchase prints of the customer's digital images, or to order image imprinted products (e.g., coffee cups, tee-shirts or other personalized products), an eCommerce server 9 sends the request to the tiered programming layer 2 and a store manager 10. The store manager 10 utilizes the tiered programming layer 2 to retrieve a list of the various types of products being offered by the photoshop. When the customer selects a type or category of product (e.g., prints, clothing or gifts), the store manager 10 retrieves the products, along with pricing and image size requirements from the lab database 3, and displays a list of products to the customer on the customer's computer monitor. The customer then selects a specific product (e.g., number of prints, or type and size tee-shirt) to purchase and continues selecting products until done. When the customer is ready to make a purchase, the store manager 10 retrieves payment and shipping options, along with tax rules used to calculate the appropriate tax for the purchase. These options and tax rules are obtained from that portion of the lab database 3 that contains the photolab's feature-set data which was obtained from the photolab when the website was created or updated. The customer may then complete his or her purchase by selecting from the options that are displayed.

After the purchase is made, the store manager 10 stores the customer's order in that portion of the lab database 3, which is associated with the customer. Then the product fulfillment unit 11 retrieves the customer's order and locates the customer's images stored in the image archive file server 8. The centralized processing system 1 then passes the customer's product selection information and image data to a fulfillment company selected by the photolab to produce the customer's order (i.e., prints and/or image imprinted products). The fulfillment companies are illustrated in FIG.

3 as Fulfillment $Co._1$, Fulfillment $Co._2$, Fulfillment $Co._3$, Fulfillment $Co._4$ . . . . Fulfillment $Co._n$. The fulfillment company then ships the products to the customer in accordance with the customer's shipping instructions. Once the products are shipped, payment is made directly into the photolab merchant deposit account.

The present invention provides the following advantages to the photolabs: enables them to provide a complete Internet-based photo-sharing and eCommerce solution to their customer base while protecting them from exposure to other corporate brands and messaging; enables them to have complete control over the business aspects of their Internet storefront; allows them to route all on-line orders to fulfillment centers of their own choosing; gives them complete control over the quality of the goods and services their customers receive; gives them the ability to capture the personal information of their customers and use that information exclusively for the benefit of the photolab; allows them to retain their customers by providing them with a service which will continue to be useful after the customer switches from film to digital photography, and the photolab may sell less film over time but their print sales will not decline; and allows them to have access to a scalable, reliable, high performance, customizable, Internet-based, photo-sharing system at an affordable price.

While the present invention has been described with reference to a few embodiments, the description is illustrative of the invention and is not to be construed as limiting the invention. Various modifications may occur to those skilled in the art without departing from the scope of the invention as defined by the appended claims.

What is claimed is:

1. A method for enabling a plurality of service companies to provide, on a network, digital image processing and storage services to customers of each service company, the method comprising the steps of:

a) providing a database partitionable or indexable by service company, b) receiving website feature-set data from a service company and storing said data in a portion of said database partitioned or indexed for the service company;

c) generating a website for each service company on the basis of the received website feature-set data;

d) associating unique network addresses with each of said websites;

e) receiving at least one digital image via one or more of said websites;

f) storing each received digital image in the portion of the database partitioned or indexed to the service company through whose website the digital image was received; and g) providing a customer of a service company with access to the stored digital image in the portion of the database partitioned or indexed to the service company, wherein the service company thereafter provides the service to the customer.

2. A method according to claim 1, wherein the digital image received in step (f) is stored in a portion of the database further partitioned or indexed to the customer of the service company trough whose website the digital image was received.

3. A method according to claim 1, wherein step (c) is performed by using the website feature-set data to complete a template.

4. A method according to claim 1, wherein the feature-set data include at least information relating to branding, a trademark, contact information, style schemes, privacy policies, a URL pointing to other related websites relating to the service company, prices for products or services, shipping options, fulfillment options and promotional material.

5. A method according to claim 1, further comprising the step (h) of transmitting an order placed by the customer to a destination preselected by the service company.

6. A network system for enabling a plurality of service companies to provide services, via a network, relating to digital image processing and storage to customers of each service company, the system comprising:

a) a centralized processing system configured to receive website feature-set data from a service company and storing said data;

b) a integration module configured to generate a website for each service company on the basis of the received website feature-set data;

c) a file server configured to receive digital images via each service company's website; and, d) a file server configured to store said digital images in a database partitioned or indexed to the service company through whose website the image was received, wherein the central processing system is further configured to associate a unique network address with the website generated for each service company, and wherein the central processing system is further configured to provide a customer of a service company with access to the portion of the database partitioned or indexed to the service company, wherein the service company thereafter provides the service to the customer.

7. A network system according to claim 6, wherein the database is further partitioned or indexed to the customer of the service company through whose website the digital image was received, for storage of the digital image in portion of the database partitioned or indexed to the customer.

8. A network system according to claim 6, wherein the integration module is configured to generate the website by using received website feature-set data to complete a template.

9. A network system according to claim 6, wherein the integration module is further configured to populate the service company's website with website feature-set data including information relating to branding, a trademark, contact information, style schemes, privacy policies, a URL pointing to other related websites relating to the service company, prices for products or services, shipping options, fulfillment options and promotional material.

10. A network system according to claim 6, wherein the central processing system is further configured to transmit an order placed by the customer to a destination pre-selected by the service company.

* * * * *